United States Patent [19]
Gore et al.

[11] Patent Number: 5,313,463
[45] Date of Patent: May 17, 1994

[54] ISDN CREDIT CHECKING

[75] Inventors: Angela R. Gore, Ocean; Barbara J. Kittredge, Jackson; Julie M. Ladieu-Walton, Lawrenceville; Pamela J. Lauber, Middletown, all of N.J.

[73] Assignee: AT&T Bell Laboratories, Murray Hill, N.J.

[21] Appl. No.: 38,563

[22] Filed: Mar. 25, 1993

Related U.S. Application Data

[63] Continuation of Ser. No. 613,035, Nov. 15, 1990, abandoned.

[51] Int. Cl.⁵ .............................................. H04J 3/12
[52] U.S. Cl. ..................................... 370/110.1; 379/91
[58] Field of Search ........... 170/58.1, 60, 94.1, 170/94.3, 110.1, 54; 379/144, 91, 92, 93, 94, 96

[56] References Cited

U.S. PATENT DOCUMENTS

| | | | |
|---|---|---|---|
| 4,722,082 | 1/1988 | Furuya et al. | 370/110.1 |
| 4,736,364 | 4/1988 | Basso et al. | 370/110.1 |
| 4,750,201 | 6/1988 | Hodgson et al. | 379/91 |
| 4,763,191 | 8/1988 | Gordon et al. | 379/91 |
| 4,788,682 | 11/1988 | Vij et al. | 370/110.1 |
| 4,878,216 | 10/1989 | Yunoki | 370/110.1 |
| 4,893,330 | 1/1990 | Franco | 379/91 |
| 4,903,263 | 2/1990 | Patel et al. | 370/60 |
| 4,935,956 | 6/1990 | Hellwarth et al. | 379/144 |
| 4,954,958 | 9/1990 | Savage et al. | 379/94 |
| 4,989,202 | 1/1991 | Soto et al. | 370/110.1 |
| 4,996,685 | 2/1991 | Farese et al. | 370/110.1 |
| 4,999,836 | 3/1991 | Fujiwara | 370/60 |
| 5,018,191 | 5/1991 | Catron et al. | 379/94 |
| 5,027,349 | 6/1991 | Thorne | 370/58.1 |
| 5,043,983 | 8/1991 | Dorst et al. | 370/110.1 |
| 5,184,345 | 2/1993 | Sahni | 370/110.1 |
| 5,187,710 | 2/1993 | Chau et al. | 370/110.1 |

OTHER PUBLICATIONS

"AT&T Telemarketing Products & Services", AT&T Technology, vol. 4, No. 1, 1989, pp. 50–55 Pryor et al.
"Emerging Telecommunications Needs of the Card Industry", IEEE Communications Magazine, vol. 22, No. 7, Jul. 1984, pp. 26–31, S. B. Weinstein.
"Telemarketing and the Intelligent Network, Synergy for Business", International Conference on Intelligent Networks, Mar. 1989, Bordeaux, France, pp. 247–257, M. W. Bono.

*Primary Examiner*—Douglas W. Olms
*Assistant Examiner*—Dang Ton
*Attorney, Agent, or Firm*—Joseph J. Opalach

[57] ABSTRACT

A business performs a credit check on a customer's credit card number by utilizing the D-channel of an Integrated Services Digital Network (ISDN) facility. The ISDN facility connects the business to a telecommunications network, which utilizes signaling system number 7 (SS7). Specifically, the ISDN Q.931 protocol is modified to allow the Q.931 FACILITY message to include: a) credit check request, b) a call reference number, and c) the customer's credit card number. This information is sent, via the ISDN D-channel, to the telecommunications network, which passes the information, via an SS7 Transaction Capability Application Part (TCAP) message, to a credit checking data base. A result from the credit checking data based is then passed back through the telecommunications network to the business on the D-channel of the ISDN facility.

15 Claims, 3 Drawing Sheets

FIG. 1 "PRIOR ART"

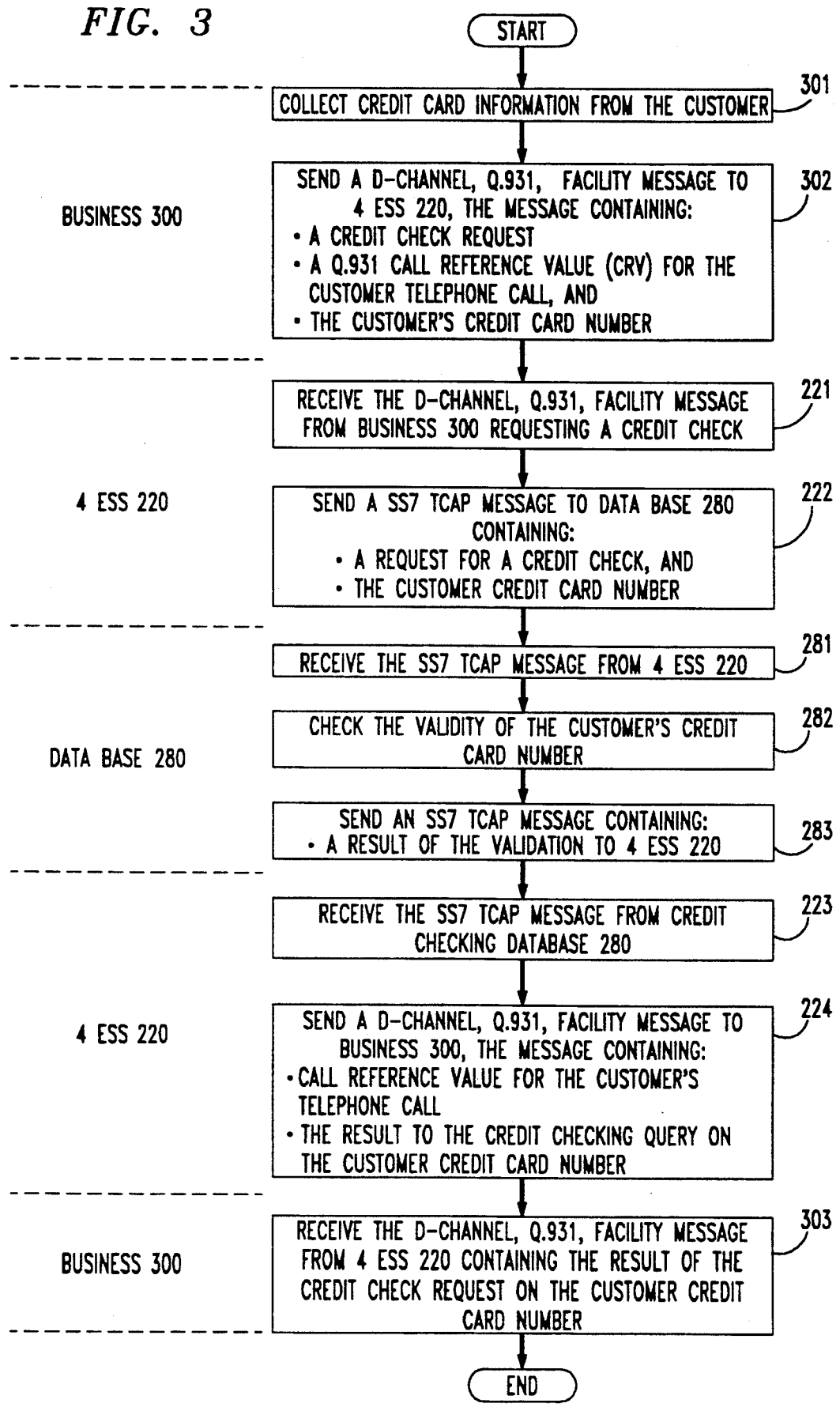

ISDN CREDIT CHECKING

This application is a continuation of application Ser. No. 07/613,035, filed on Nov. 15, 1990 now abandoned.

BACKGROUND OF THE INVENTION

The present invention relates to apparatus and methods used to perform validation of credit card numbers.

A commercial transaction conducted by a telephone call between a business and a customer is often concluded by the business accepting the customer's credit card number in order to bill the customer for any product or service sold to the customer. However, before completing the sale, the business normally performs a credit check on the customer's credit card number to ensure that the number is valid. Such credit checking, as is known in the art, is performed by the business using a telecommunications connection to a credit-checking service to which the credit card number is passed for validation.

Usually, the business will subscribe to a number of telecommunication facilities (loop supervision, etc.) in order to provide the appropriate number of communication lines to support the business's communication needs. In the case of the above mentioned commercial transaction, one or more of these lines is used for establishing a connection to the credit-checking service. As a result, in determining the number of communication lines needed to support the business, the business must take into account the use of additional communications lines to perform credit checking. For example, if the volume of credit checks that need to be performed is high, the business may subscribe to a dedicated private line service; or, if the volume is low, the business may occasionally use one of its loop supervision lines for dial-up access to the credit-checking service.

SUMMARY OF THE INVENTION

We have come to realize that the prior arrangement of performing a credit check on customer information is disadvantageous since a business must allow for a separate communications line, and its associated costs and terminal equipment, in order to validate credit information supplied by the customer.

Therefore, in accordance with the invention, we have realized a method and apparatus which allows a business to validate information from a customer without requiring the business to use an additional communications line. Specifically, the D-channel, of an ISDN facility, can be used to validate the customer information.

In a preferred embodiment, a business subscribes to an "800" telecommunications service which allows a customer to call, at no charge, the business to place an order or request a service. The 800 telecommunications service is provided to the business by a telecommunications network through a Primary Rate Integrated Service Digital Network (PRI ISDN) telecommunications facility. Information from a customer is received on a B-channel of the PRI ISDN facility. While the customer call is still active on the B-channel (the customer is on hold, etc.), the D-channel of the PRI ISDN facility is used to send customer information to, and receive validation information from, a credit-checking service. The credit-checking service is typically comprised of a data base which is connected to the telecommunications network.

In accordance with a feature of the invention, a Q.931 FACILITY message is used to transfer the information on the D-channel.

In accordance with another feature of the invention, the information that is validated is the customer's credit card number.

BRIEF DESCRIPTION OF THE DRAWING

In the drawing,

FIG. 3 is a flow diagram of an illustrative method used in the system of FIG. 2 for carrying out the credit check.

DETAILED DESCRIPTION

As noted earlier, a commercial transaction conducted by a telephone call between a business and a customer is often concluded by the business accepting the customer's credit card number in order to bill the customer for any product or service sold to the customer. However, before completing the sale, the business normally performs a credit check on the customer's credit card number to ensure that the number is valid. Such credit checking, as is known in the art, is performed by the business using an additional telecommunications connection to a credit-checking service to which the credit card number is passed for validation. The validation of the customer credit card number may not only include the validity of the credit card number itself, but also the ability of the customer to charge a particular amount for the product or service sold to the customer.

Figure 1:
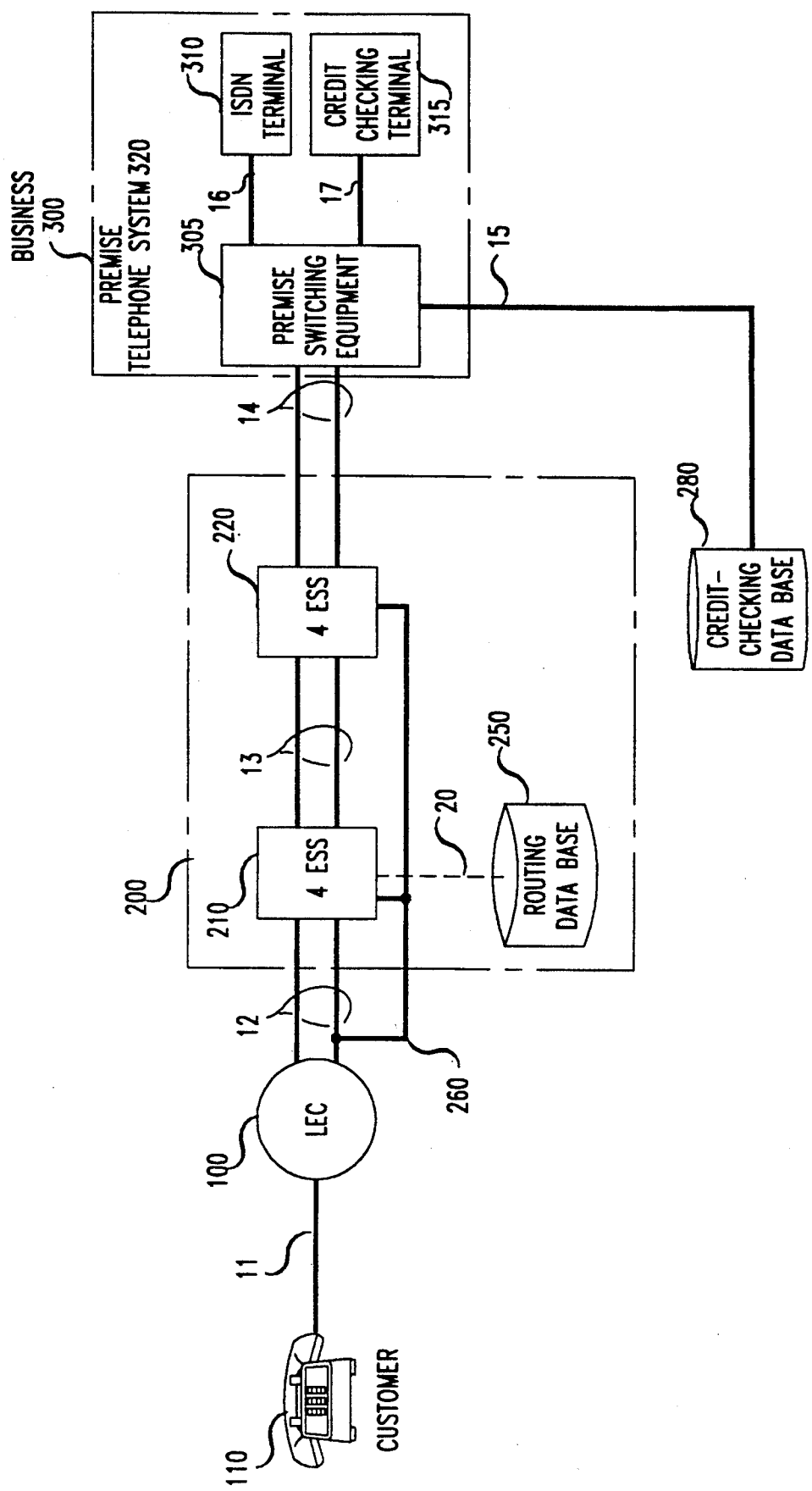
FIG. 1 is a block diagram of an illustrative communication system, as known in the prior art, for performing a credit check on a customer's credit card number.

A representative communication system for credit checking, as known in the prior art, is shown in FIG. 1. It is assumed, for illustrative purposes only, that business 300 subscribes to an "800" telecommunications service such as the MEGACOM ® 800 (M800) service from AT&T. This 800 service is provided by telecommunications network 200 and allows a customer at telephone 110 to dial business 300, at no charge (or toll-free), to place an order, or even request a service, from the convenience of his or her residence or office. The communications system of FIG. 1 is comprised of well-known technologies, and references to relevant illustrative technical material are included hereinbelow. Also, it is assumed the nomenclature of a "telephone call" is understood to represent any of the well-known methods, processes and technologies used in telecommunications for supporting a voice, or data, communication between a starting point, the calling party, and the destination point, the called party.

Customer telephone 110 represents one of a plurality of telephone subscribers and can be either a "rotary" or "touch-tone" telephone for the purposes of this example. Customer telephone 110 is connected to local exchange carrier (LEC) 100 via representative analog line facility 11 (a loop supervision trunk, etc.). LEC 100 is representative of one of a plurality of local exchange carriers that are served by telecommunications network 200 and is typically comprised of stored-program-control switching system technology such as that described in *The Bell System Technical Journal*, Vol. 56, No. 2, February, 1977, and Vol. 64, No. 6, Part 2, July-August, 1987. LEC 100 is connected through path 12 to telecommunications network 200. Path 12 is representative of well-known network access facilities, such as trunks and other stored-program-control switches through which a telephone call is routed to telecommunications network 200. Telecommunications network 200 is illustratively comprised of a plurality of stored-program-control switching systems, herein represented by 4 ESS TM digital switches 210 and 220 available from AT&T. The 4 ESS digital switch is described in detail in *The Bell System Technical Journal*, Vol. 56, No. 7, September, 1977, and Vol. 60, No. 6, Part 2, July–August, 1981. For the purposes of this example, 4 ESS switching systems 210 and 220 are the originating and terminating points, respectively, of network 200. (Examples of network architecture can be found in the *AT&T Technical Journal*, Vol. 66, Iss. 3, May–June, 1987.) An illustrative telephone call will enter network 200 through switch 210, the originating point of the telephone call in the network. Switch 210 will access network routing data base 250 in a well-known way for routing information in order to route the telephone call to terminating switch 220 through path 13. Path 13 may include other network stored-program-control switches and represents typical network interconnecting trunk facilities through which an illustrative telephone call may be routed. Telecommunications network 200 serves a plurality of businesses such as business 300. Business 300 is connected to 4 ESS switch 220 over trunk facility 14, illustratively a "primary rate interface" (PRI) Integrated Services Digital Network (ISDN) facility. ISDN technology is described in the *AT&T Technical Journal*, Vol. 66, Iss. 3, May–June, 1987, and Vol. 65, Iss. 1, January–February, 1986. ISDN trunk facility 14 terminates in premise telephone system 320 illustrated herein by premise switching equipment (PSE) 305, which is illustratively an AT&T System 85 digital PBX, and a plurality of user terminals such as ISDN terminal 310 and credit checking terminal 315.

In order to provide the ability to route an illustrative telephone call from customer 110 to business 300, the communication system of FIG. 1 also includes well-known Common Channel Signaling (CCS) network 260 for transferring control information such as billing, routing, and supervisory information messages between the representative stored-program-control switching systems shown in FIG. 1. A typical CCS network is described in *The Bell System Technical Journal*, Vol. 57, No. 2, February, 1978, and Vol. 61, No. 7, September, 1982, and in the *AT&T Technical Journal*, Vol. 66, Iss. 3, May–June 1987, and Vol. 65, Iss. 1, January–February, 1986. For the purposes of this example, it is assumed that CCS network 260 conforms to the standards for Signaling System number 7 (SS7) as described in *American National Standards Institute* (ANSI) T1.114 through T1.115. In addition, it is assumed that all ISDN equipment utilizes the well-known ISDN Q.931 protocol, and supports ISDN applications as defined in *AT&T Networks ISDN Primary Rate Interface Specification*, Technical Reference 41449, April 1989, and *AT&T Networks ISDN Primary Rate Interface and Special Applications Specification*, Technical Reference 41459, April 1989.

Trunk facility 14 represents one of a number of ISDN trunks subscribed to by business 300. As is known in the art, each primary rate ISDN trunk is typically comprised of 23 communication channels, known as "B-channels", that are available to business 300 for use in sending and receiving information. In addition, each ISDN trunk also includes a "D-channel" which is used for sending signaling and control data in order to manage the information carried by the 23 B-channels.

As is well-known in the art, a customer can originate a typical "800" telephone call by lifting the handset on telephone 110, thereby being connected to LEC 100, and then dialing a predetermined "800" number which corresponds to business 300. The telephone call is then routed through telecommunications network 200 to business 300 on one of the available B-channels of ISDN facility 14. ISDN facility 14 is terminated in PSE 305. Business 300 completes the call from customer telephone 110 upon answering the incoming telephone call at ISDN terminal 310.

Typically, if the customer places an order for a product or service, the customer provides a credit card number to business 300 to complete the sale. However, before accepting the order, business 300 will normally verify the credit card number by simultaneously accessing credit-checking data base 280. Access to credit-checking data base 280 requires a line that is separate from, and additional to, the B-channel that is already being used to support the voice-call from customer 110. As shown in FIG. 1, business 300 is connected to credit-checking data base 280 through credit-checking terminal 315, PSE 305, and private line facility 15. Although access to credit-checking data base 280 is illustratively provided herein by dedicated facility 15, business 300 could alternatively use a dial-up facility to access credit-checking data base 280, e.g., an additional one of the B-channels of ISDN facility 14. In either case, business 300 is using an additional information channel, to establish the connection to credit-checking data base 280, that could otherwise be used by business 300 for transmitting information. Therefore, in accordance with the invention, we have realized a method and apparatus which allows a business to validate information from a customer without requiring the business to use an additional communications line. Specifically, the D-channel, of an ISDN facility, is used to validate the customer information.

Figure 2:
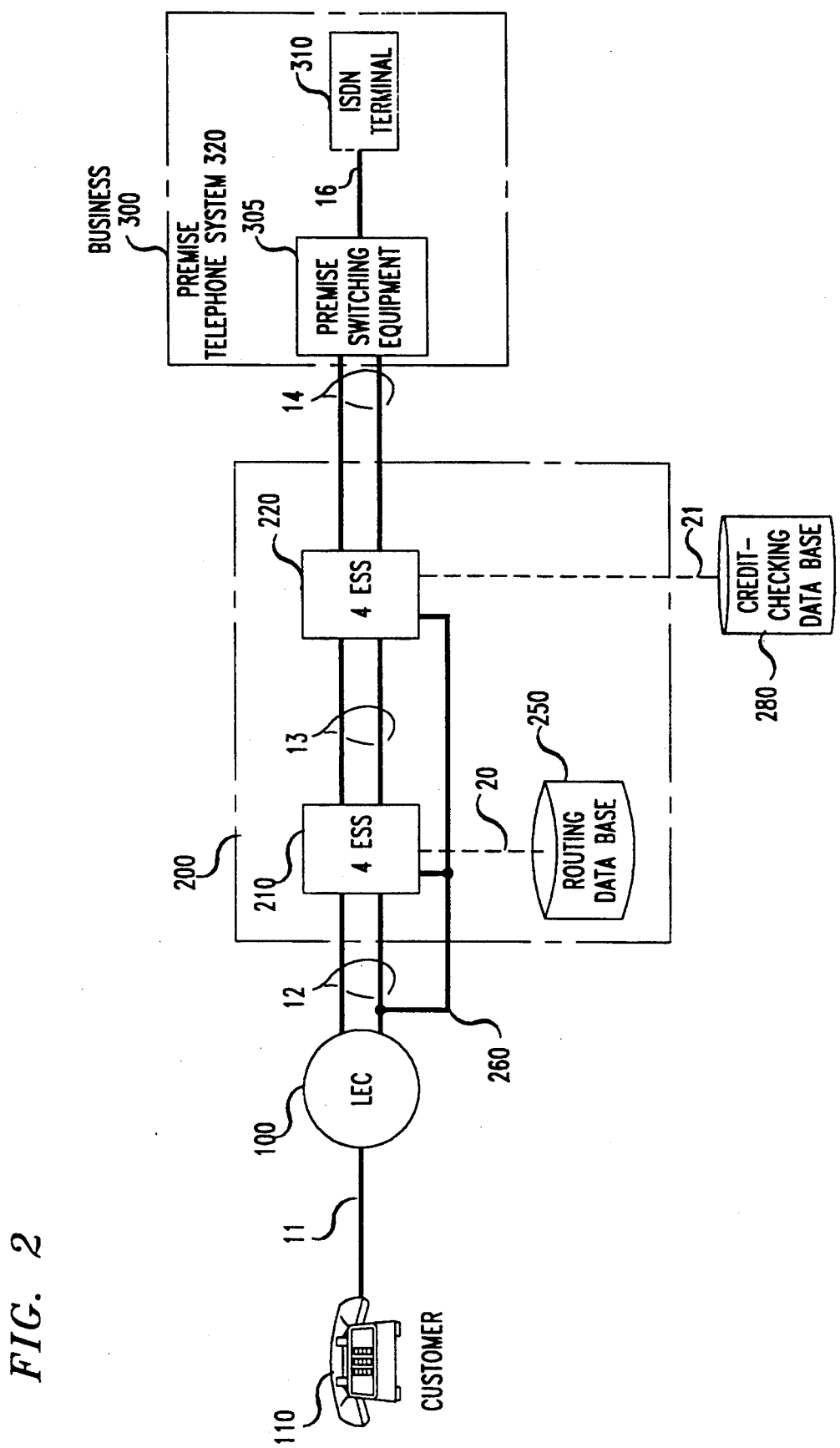
FIG. 2 is a block diagram of an illustrative communication system, embodying the principles of the invention, for performing a credit check on a customer's credit card number.

The system of FIG. 2 is identical to the system of FIG. 1 except that credit-checking data base 280 is now connected to telecommunications network 200 and the need for a separate communications line is eliminated. By virtue of the fact that credit-checking data base 280 is connected to telecommunications network 200, data base 280 is accessed (like routing data base 250) by the stored-program-control switching elements, e.g., 4 ESS 220, using SS7 (e.g., see *ANSI T1.114 Transaction Capability Application Part* (TCAP)). Credit-checking data base 280 is illustratively connected to 4 ESS switch 220 via path 21. Path 21 is representative of well-known facilities, such as trunks and other stored-program-control switches, through which access to credit-checking data base 280 is provided. In order to facilitate understanding of the inventive concept, reference can also be made to FIG. 3 which represents an illustrative method used herein to verify the customer credit card number.

As before, a customer, via telephone 110, places a telephone call to business 300. As a result of the telephone call, business 300 collects credit card information from the customer (FIG. 3, block 301). Business 300 then sends a D-channel, Q.931, FACILITY message to 4 ESS 220 from ISDN terminal 310. The message includes: a) a credit check request, b) the Call Reference Value (CRV) of the customer call, and c) the customer's credit card number (block 302). (It should be noted that a FACILITY message, as currently defined in the art, contains a number of fields, or information elements, for transmitting information between the ISDN endpoints, ISDN terminal 310 and 4 ESS 220. Illustratively, in accordance with a feature of the invention, the FACILITY message is used herein to transmit the credit check request, CRV, and customer's credit card number to 4 ESS 220. The credit check request, CRV, and customer's credit card number are particular data values, each assigned to a respective one, or more, of the information elements of the FACILITY message. For example, the credit check request is identified with a predefined data value in the "operation" and "item" elements.)

The FACILITY message is received from business 300 by 4 ESS 220 (block 221). The credit check request is identified, by 4 ESS 220, with the received CRV, and an SS7 TCAP message is sent, by 4 ESS 220, to credit-checking data base 280 containing: a) a request (or query) for a credit check, and b) the customer credit card number (block 222).

Credit-checking data base 280 receives the TCAP message from 4 ESS 220 requesting a credit check (block 281) and checks the validity of the customer credit card number (block 282). Credit-checking data base 280 then sends a TCAP message to 4 ESS 220 with the results of the validation, e.g., a validation number (block 283).

The TCAP message is received from credit-checking data base 280 by 4 ESS 220 (block 223). A D-channel, Q.931, FACILITY message is then sent, by 4 ESS 220, to business 300 containing: a) CRV for the customer's telephone call, and b) the response to the credit-checking query on the customer credit card number (block 224).

Business 300 receives the D-channel, Q.931, FACILITY message from 4 ESS 220 containing the results of the card check request via terminal 310 (block 303), and completes processing of the customer order. Thus, a credit check is performed on a customer credit card number without the use of an additional information channel by business 300.

The foregoing merely illustrates the principles of the invention. For example, besides a credit card number, other information, such as Automatic Number Identification (ANI), can also be used to verify a customer's account. In fact, such information could be supplied automatically by the telecommunications network for a particular customer telephone call. Also, the telephone connection, though illustratively described herein as originating from the customer, could originate from the business. In addition, the telecommunications network configuration used herein is merely representative, i.e., other network and configuration architectures can be used. Likewise, other premise telephone systems could be used, e.g., a telephone set that interfaces directly to the network with a basic rate interface (BRI) ISDN facility. Finally, the credit-checking data base, though illustratively shown herein connected to the telecommunications network, can be located anywhere, e.g., connected to the telecommunications network through another communications network. As a result, it should be realized that the invention is not limited to this particular embodiment and that additional embodiments, modifications and applications which will become obvious to those skilled in the art are included in the spirit and scope of the invention.

We claim:

1. A method for validating credit information, the method comprising the steps of:
   receiving the credit information from a customer on a B-channel of an ISDN facility at a business terminal;
   sending the credit information on a D-channel of the ISDN facility to a telecommunications network;
   validating the credit information provided by the D-channel of the ISDN facility;
   providing a result of the validation from the telecommunications network on the D-channel of the ISDN facility; and
   receiving a result of the validation from the D-channel of the ISDN facility at the business terminal;
   where said credit information and said result are embedded within a respective D-channel signaling message to and from the telecommunications network.

2. The method of claim 1 wherein the D-channel signaling message of the sending step includes a FACILITY message, the FACILITY message including: a) a request for validation of the credit information, b) a Call Reference Value for the customer, and c) the credit information.

3. The method of claim 1 wherein the D-channel signaling message of the receiving a result step includes a FACILITY message, the FACILITY message including: a) a Call Reference Value for the customer, and b) the result of the validation.

4. The method of claim 1 wherein the validating step comprises the further steps of:
   receiving the credit information from the D-channel of the ISDN facility in a stored-program-control switch of the telecommunications network;
   sending the credit information from the stored-program-control switch to a data base;
   searching the data base to provide the result of the validation, where the search is keyed on said information; and
   sending the result from the data base to the stored-program-control switch.

5. The method of claim 4 wherein the sending the credit information step includes the step of sending a SS7 TCAP message, the TCAP message containing the credit information.

6. The method of claim 4 wherein the sending the result from the data base step includes the step of sending a SS7 TCAP message, the TCAP message containing the result.

7. The method of claim 1 wherein the credit information is a credit card number.

8. Apparatus for providing a communication channel to validate credit information from a customer, the apparatus being comprised of:
   a stored-program-control switch;
   a premise telephone system; and
   an ISDN facility for providing communication between the stored program control switch and the premise telephone system, the facility being comprised of a plurality of B-channels and a D-channel, the D-channel being used for a) sending the credit information in a first D-channel signaling message from the premise telephone system to the stored-program-control switch and for b) sending a result of the validation of the credit information from the stored-program-control switch to the premise telephone system in a second D-channel signaling message.

9. The apparatus of claim 8 wherein the premise telephone system is further comprised of:
   a stored-program-control switch; and
   an ISDN terminal responsive to the stored-program-control switch for providing access to the D-channel of the ISDN facility.

10. The apparatus of claim 8 wherein the credit information is a credit card number.

11. The apparatus of claim 8 wherein the credit information is received from the customer on a B-channel of the ISDN facility.

12. Apparatus for validating information from a customer, the apparatus being comprised of:
   a telecommunications network;
   a credit data base for receiving the information from the telecommunications network and for validating the information and for providing a result of the validation to the telecommunications network;
   a premise telephone system; and
   an ISDN facility for providing communication between the telecommunications network and the premise telephone system, the facility being comprised of a plurality of B-channels and a D-channel, the D-channel being used for a) sending the information in a first D-channel signaling message from the premise telephone system to the telecommunications network and for b) sending a result of the validation of the information in a second D-channel signaling message from the telecommunications network to the premise telephone system.

13. The apparatus of claim 12 wherein the premise telephone system is further comprised of:
   a stored-program-control switch; and
   an ISDN terminal responsive to the stored-program-control switch for providing access to the D-channel of the ISDN facility.

14. The apparatus of claim 12 wherein the information is a credit card number.

15. The apparatus of claim 12 wherein the information is received from the customer on a B-channel of the ISDN facility.

* * * * *